W. F. HARBAUGH & C. F. SMITH.
VEGETABLE CUTTER.
APPLICATION FILED DEC. 21, 1908.
947,076.
Patented Jan. 18, 1910.
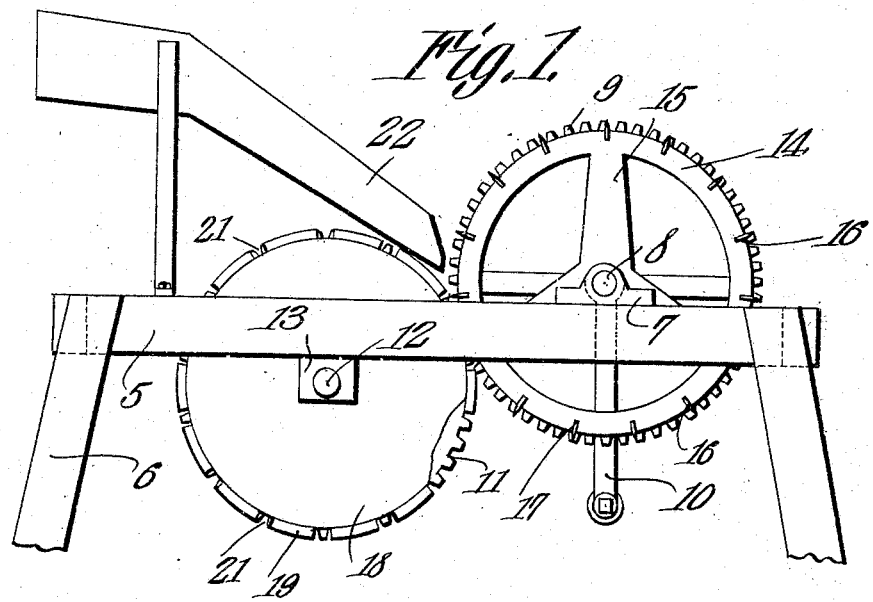
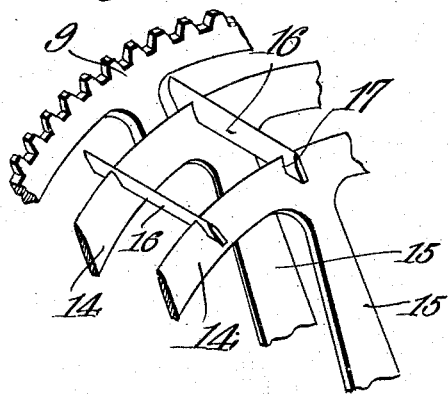
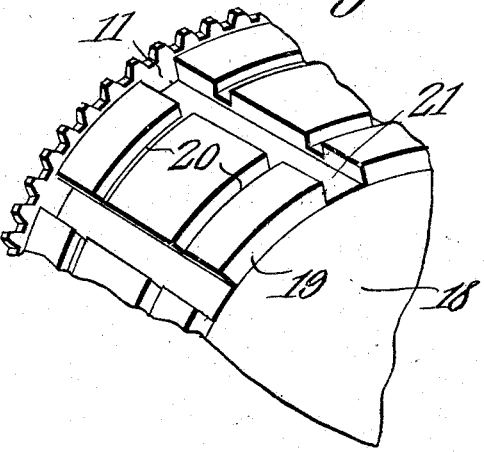
Witnesses
Inventors
William F. Harbaugh and
Charles F. Smith
By C. A. Snow & Co.
Attorneys

UNITED STATES PATENT OFFICE.

WILLIAM F. HARBAUGH AND CHARLES F. SMITH, OF LAKOTA, NORTH DAKOTA.

VEGETABLE-CUTTER.

947,076. Specification of Letters Patent. Patented Jan. 18, 1910.

Application filed December 21, 1908. Serial No. 468,601.

*To all whom it may concern:*

Be it known that we, WILLIAM F. HARBAUGH and CHARLES F. SMITH, citizens of the United States, residing at Lakota, in the county of Nelson and State of North Dakota, have invented a new and useful Vegetable-Cutter, of which the following is a specification.

It is the object of the present invention to provide an improved mechanism for cutting vegetables such as potatoes, and one of the objects of the invention is to so construct the mechanism as to produce pieces or particles of substantially uniform size, such an arrangement of parts being particularly desirable where the mechanism is to be used for the purpose of cutting seed potatoes inasmuch as a minimum loss of "eyes" will result as compared to the loss where such mechanism is employed as will not act in a uniform manner on the potatoes.

In the accompanying drawings, Figure 1 is a side elevation of the mechanism embodied in the invention. Fig. 2 is a perspective view in detail of a portion of one of the cutter elements, and Fig. 3 is a view similar to Fig. 2 showing a portion of the other cutter elements.

The frame in which the mechanism is mounted, while it may be of any desired form or construction, preferably includes spaced side sills 5 and supporting standards 6 at the upper ends of which the said sills are arranged.

Journaled in suitable bearings 7, preferably mounted upon the upper edges or sides of the sills 5, is a shaft 8 and fixed upon this shaft for rotation therewith is a gear 9, the shaft being adapted to be rotated through the instrumentality of a crank handle 10 also fixed thereon. The gear 9 meshes with a similar gear 11 which is fixed upon a shaft 12 in suitable bearings 13 arranged preferably upon the under edges or side sills 5, and it will be understood that rotation of the shaft 8 will result in a corresponding rotation, in the opposite direction, of the shaft 12 and inasmuch as the gears 9 and 11 are of equal diameter, the speed of rotation of the two shafts 8 and 12 will be the same.

Fixed upon the shaft 8 for rotation therewith is one of a pair of cutter elements which comprise the cutting mechanism of the machine, and this element is comprised of a pair of spaced annular knives 14 having integral spokes or webs 15 and transverse knives 16 which, while they may be formed integral with the knives 14, are here shown as secured in notches 17 formed at equi-distant points throughout the peripheries of the knives 14. The knives 16 preferably have their cutting edges projecting beyond the peripheries of the knives 14 and they also project at their ends laterally beyond the said knives 14 as clearly shown in Fig. 2 of the drawings. It will thus be seen that the cutter element just described is comprised of annular knives and a plurality of transverse knives intersecting the cutting edges of the annular knives, and it will be understood that any number of the knives 14 or 16 may be employed according to the character of the material to be cut. The other cutter element of the mechanism is in the form of a cylindrical drum or wheel 18 which is provided or formed upon its peripheral surface with a plurality of spaced segments 19 each formed with a pair of grooves 20 extending in a direction peripherally through the face thereof, the spaces between the segments resulting in transverse grooves 21.

As shown in the drawings, the knives 14 and 16 of the first described cutting element, and the grooves 20 and 21 of the second described cutter element are so relatively positioned that upon rotation of the two cutting elements, in a direction toward each other, the transverse knives 16 will successively engage in the grooves 21 and the knives 14 will engage in the corresponding grooves 20 in the segments 19 of the second described cutter element, so that potatoes or the like, fed between the two rotating elements, will be chopped or cut into pieces of substantially uniform size and shape. In order to so direct the potatoes or the like to be cut, a feed chute 22 is supported upon the frame of the machine with its discharge or lower end extending to a point directly above the point of coöperation of the cutting element. It will further be understood, in connection with the foregoing description, that not only do the blades 16 act to cut the material fed between the rotating cutting elements, but these blades also serve to feed the material, in a positive manner, to a position to be cut between the elements, and that they therefore perform, broadly speaking a cutting and feeding function.

What is claimed is:—

In cutter mechanism of the class described, coöperating rotary cutting elements, and a hopper having its discharge end above but in a plane between the said elements, one of the said elements being of skeleton structure and comprising peripheral blades and transverse blades intersecting the peripheral blades at intervals, said transverse blades projecting at their edges beyond the peripheral blades, whereby material fed to said hopper will be drawn between the elements, the other element being provided with intersecting grooves arranged to receive the cutting edges of the several blades of the first mentioned element, said first mentioned element having its axis located in a plane above the plane occupied by the axis of the second mentioned element, the elements being of the same diameter.

In testimony that we claim the foregoing as our own, we have hereto affixed our signatures in the presence of two witnesses.

WILLIAM F. HARBAUGH.
CHAS. F. SMITH.

Witnesses:
GEO. A. KELLOGG,
O. C. STAUTZ.